(12) United States Patent
Lo et al.

(10) Patent No.: US 9,933,589 B2
(45) Date of Patent: Apr. 3, 2018

(54) LENS ASSEMBLY, CAMERA MODULE, AND MANUFACTURING METHOD

(71) Applicant: SAE Magnetics (H.K.) Ltd., Hong Kong (CN)

(72) Inventors: Chi Wai Lo, Hong Kong (CN); Sidney Shen Kuang Chou, Hong Kong (CN); Yiu Sing Ho, Hong Kong (CN); Fen Yan Li, DongGuan (CN); Xin Tao Lang, DongGuan (CN); Gui Ming Wei, DongGuan (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 15/238,060

(22) Filed: Aug. 16, 2016

(65) Prior Publication Data
US 2018/0024307 A1   Jan. 25, 2018

(30) Foreign Application Priority Data
Jul. 20, 2016   (CN) ................. 2016 2 0766530 U (51) Int. Cl.
*H04N 5/225*   (2006.01)
*G02B 7/00*   (2006.01)
*G02B 7/02*   (2006.01)

(52) U.S. Cl.
CPC ............ *G02B 7/003* (2013.01); *G02B 7/02* (2013.01); *G02B 7/023* (2013.01); *H04N 5/2253* (2013.01); *H04N 5/2254* (2013.01)

(58) Field of Classification Search
CPC ...... H04N 5/2253; H04N 5/2254; G02B 7/02; G02B 7/003; G02B 7/023
See application file for complete search history.

(56) References Cited

U.S. PATENT DOCUMENTS

| | | | |
|---|---|---|---|
| 9,319,573 B2* | 4/2016 | Oh | G02B 7/08 |
| 2006/0063399 A1* | 3/2006 | Li | H01R 13/6594 439/70 |
| 2007/0086771 A1* | 4/2007 | Lee | G02B 7/021 396/144 |
| 2008/0211955 A1* | 9/2008 | Avital | G02B 7/102 348/335 |
| 2013/0142504 A1* | 6/2013 | Warren | G03B 17/02 396/541 |
| 2013/0240714 A1* | 9/2013 | Higashitsutsumi | G02B 5/201 250/208.1 |
| 2014/0111877 A1* | 4/2014 | Uno | H02N 2/004 359/814 |
| 2016/0109681 A1* | 4/2016 | Lam | G02B 7/09 359/824 |

(Continued)

*Primary Examiner* — Lin Ye
*Assistant Examiner* — John H Morehead, III
(74) *Attorney, Agent, or Firm* — Nixon & Vanderhye PC (57) ABSTRACT

A lens assembly includes a lens holder and a lens barrel that are coaxial and integrated in a unity, a cavity is defined therein to receive at least one lens, at least three guiding legs are extended from a bottom of the lens holder, and the guiding legs define a plane that is parallel to an installation plane of the lens. It can achieve an accurate optical axis alignment between the lens and the image sensor, reduce total assembly tolerances of the camera module thereby improving imaging quality, and reduce manufacturing cost to benefit the popularization in industries.

15 Claims, 6 Drawing Sheets

(56) References Cited

U.S. PATENT DOCUMENTS

| | | | |
|---|---|---|---|
| 2016/0274328 A1* | 9/2016 | Shin | G02B 7/09 |
| 2016/0299349 A1* | 10/2016 | Cho | G02B 27/646 |
| 2017/0115464 A1* | 4/2017 | Lee | G02B 7/04 |
| 2017/0155809 A1* | 6/2017 | Sauer | H04N 5/2252 |

* cited by examiner

LENS ASSEMBLY, CAMERA MODULE, AND MANUFACTURING METHOD

CROSS REFERENCE TO RELATED APPLICATION

This application is based on Chinese Application No. 201620766530.1, filed Jul. 20, 2016, the disclosure of which is incorporated herein by reference.

FIELD OF THE INVENTION

The present invention relates to camera modules, and in particular, to a lens assembly, a camera module with the same and the manufacturing and assembly methods thereof.

BACKGROUND OF THE INVENTION

Figure 1A:
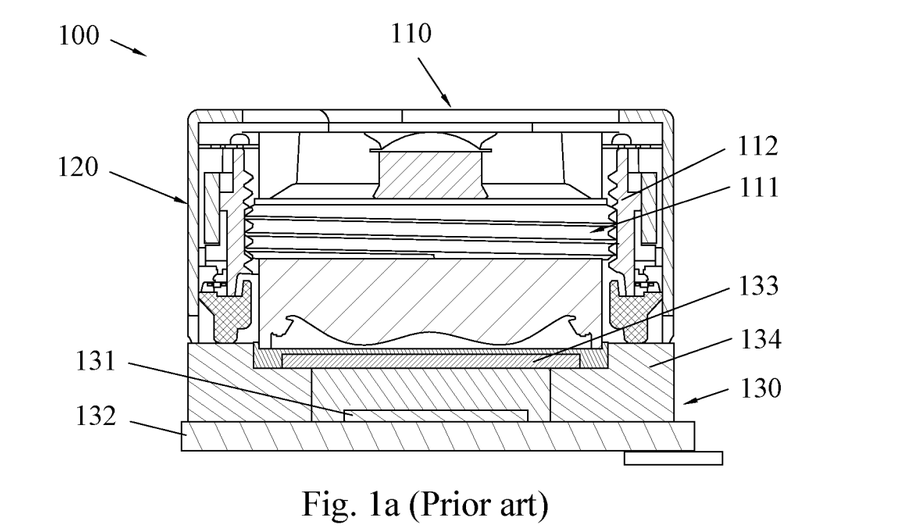
FIG. 1a is a cross-sectional view of a conventional camera module.
Figure 1B:
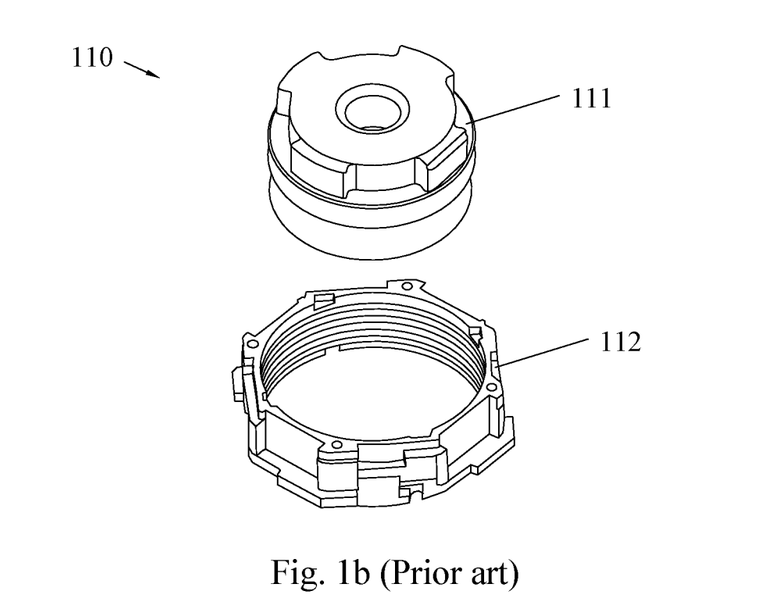
FIG. 1b is an exploded perspective view of a lens holder and a lens barrel of the camera module.

As shown in FIGS. 1a and 1b, a conventional camera module 100 includes a lens assembly 110, a motor assembly 120 and an image sensor assembly 130. The assembly process of the camera module 100 includes the following steps.

Step 1, mounting an image sensor chip 131 on a PCB 132;

Step 2, mounting a filter 133 and a filter holder 134 on the PCB 132;

Step 3, joining the bottom of the motor assembly 120 on the filter holder 134;

Step 4, installing the lens assembly 110 in the motor assembly 120.

A conventional lens assembly 110 includes a lens barrel 111 and a lens holder 112, multiple lens are stacked in the lens barrel 111, and the lens barrel 111 and the lens holder 112 are connected together by means of screw thread.

By this token, during the assembly process of the camera module, a lot of components are to be assembled which cumulates more and more assembly tolerance to degrade the imaging quality of the camera, for example the in-focus position deviates from the image center, and the definition of the image corners are uneven. Especially with the increasing resolution of the image sensor and the decreasing unit cell size of the image sensor developing, how to accurately locate the lens assembly to the image sensor to achieve an accurate optical axis alignment becomes a critical issue.

The optical axis alignment of the conventional camera module is achieved by an automatic alignment device (such as active alignment equipment) which can real time detect planar angle of image sensor to align the optical axis of the lens with the center of the image sensor, in order to reduce the assembly tolerance and improve the quality of the camera module. However, such an automatic alignment device is quite expensive, which directly restricts the development of the small and medium manufacturers.

Thus it is desired to provide an improved lens assembly, a camera module and assembly methods to overcome the drawbacks mentioned above.

SUMMARY OF THE INVENTION

One objective of the present invention is to provide a lens assembly, which can achieve an accurate optical axis alignment between the lens and the image sensor, reduce total assembly tolerances of the camera module thereby improving imaging quality, and reduce manufacturing cost to benefit the popularization in industries.

Another objective of the present invention is to provide a camera module with a lens assembly, which can achieve an accurate optical axis alignment between the lens and the image sensor, reduce total assembly tolerances of the camera module thereby improving imaging quality, and reduce manufacturing cost to benefit the popularization in industries.

One more objective of the present invention is to provide a manufacturing method of a lens assembly, which can achieve an accurate optical axis alignment between the lens and the image sensor, reduce total assembly tolerances of the camera module thereby improving imaging quality, and reduce manufacturing cost to benefit the popularization in industries.

Further an objective of the present invention is to provide a manufacturing method of a camera module, which can achieve an accurate optical axis alignment between the lens and the image sensor, reduce total assembly tolerances of the camera module thereby improving imaging quality, and reduce manufacturing cost to benefit the popularization in industries.

To achieve above objective, a lens assembly includes a lens holder and a lens barrel that are coaxial and integrated in a unity, a cavity is defined therein to receive at least one lens, at least three guiding legs are extended from a bottom of the lens holder, and the guiding legs define a plane that is parallel to an installation plane of the lens.

As a preferable embodiment, the guiding legs are evenly arranged on a circumference of the bottom of the lens holder, in a predetermined spacing, As another preferable embodiment, four guiding legs are evenly arranged on a circumference of the bottom of the lens holder, in a predetermined spacing.

A camera module includes a lens assembly, a lens driver and a image sensor assembly, the lens assembly being installed in the lens driver along an optical axis direction, the image sensor assembly located below the lens assembly, the lens assembly comprising a lens holder and a lens barrel that are coaxial and integrated in a unity, a cavity being defined therein to receive at least one lens, therein at least three guiding legs are extended from a bottom of the lens holder, the guiding legs define a plane that is parallel to an installation plane of the lens, and the guiding legs are located above the image sensor assembly and contacted with a surface of the image sensor assembly to achieve optical axis alignment.

Preferably, the image sensor assembly comprises a PCB, an image sensor mounted on the PCB, and a sensor cover arranged between the image sensor and the lens driver.

Preferably, at least three guiding holes are formed on the sensor cover, whereby the guiding legs pass through and contact with a surface of the PCB.

Preferably, at least three protrusions are formed on the surface of the PCB, on which the guiding legs are rest.

Preferably, at least three guiding holes are formed on the sensor cover, whereby the guiding legs pass through and contact with a surface of the image sensor.

Preferably, at least three first guiding holes are formed on the sensor cover, at least three second guiding holes are formed on the PCB, and the guiding legs pass through the first guiding holes and are movable in the second guiding holes.

Accordingly, a manufacturing method of a lens assembly comprises integrating a lens barrel with a lens holder and installing at least one lens in the lens holder. The lens holder and the lens barrel are integrated in a unity, at least three guiding legs are extended from a bottom of the lens holder, the guiding legs define a plane that is parallel to an installation plane of the lens.

Preferably, the guiding legs are evenly arranged on a circumference of the bottom of the lens holder, in a predetermined spacing.

Preferably, four guiding legs are evenly arranged on a circumference of the bottom of the lens holder, in a predetermined spacing.

A assembly method of a camera module comprises:

assembling an image sensor assembly; installing a lens driver on the image sensor assembly;

installing a lens assembly in the lens driver, the lens assembly comprising a lens holder and a lens barrel that are coaxial and integrated in a unity, a cavity being defined therein to receive at least one lens, at least three guiding legs being extended from a bottom of the lens holder, and the guiding legs defining a plane that is parallel to an installation plane of the lens; and locating the guiding legs on the image sensor assembly to achieve optical axis alignment.

Preferably, the method further comprises forming at least three first guiding holes on the sensor cover, wherein the guiding legs pass through the first guiding holes.

Preferably, the guiding legs are contacted with a surface of a PCB of the image sensor assembly.

Preferably, the guiding legs are contacted with a surface of an image sensor of the image sensor assembly.

Preferably, the method further comprises forming at least three second guiding holes on a PCB of the image sensor assembly, wherein the guiding legs pass through the first guiding holes and are movable in the second guiding holes.

In comparison with the prior art, since the lens holder and the lens barrel are in a unity structure, thus the assembly structure (such as the conventional screw thread structure) between the lens holder and the lens barrel is omitted, and the lens stacks can be directly installed in the cavity of the lens barrel, thereby simplifying the assembly process and reducing the assembly tolerance produced during the assembly process. In addition, because the guiding legs extended from the lens holder define the plane which is parallel to the installation plane of the lens, when the lens assembly is assembled with the image sensor chip, the guiding legs pass through guiding holes on the image sensor cover and align with the surface of the image sensor, in such a way, the plane defined by the guiding legs is parallel to the surface of the image sensor, that is the assembly benchmarks are the same, thereby achieving the accurate optical axis alignment and reducing the assembly tolerance of the parts to prevent optical axis deviation, therefore improving the imaging quality. Furthermore, the alignment can be made without expensive alignment devices, thereby decreasing the manufacturing cost.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to a lens assembly, a camera module and the manufacturing and assembly methods, which can achieve an accurate optical axis alignment between the lens and the image sensor, reduce total assembly tolerances of the camera module thereby improving imaging quality, and reduce manufacturing cost thereby benefiting the popularization in industries.

Figure 2:
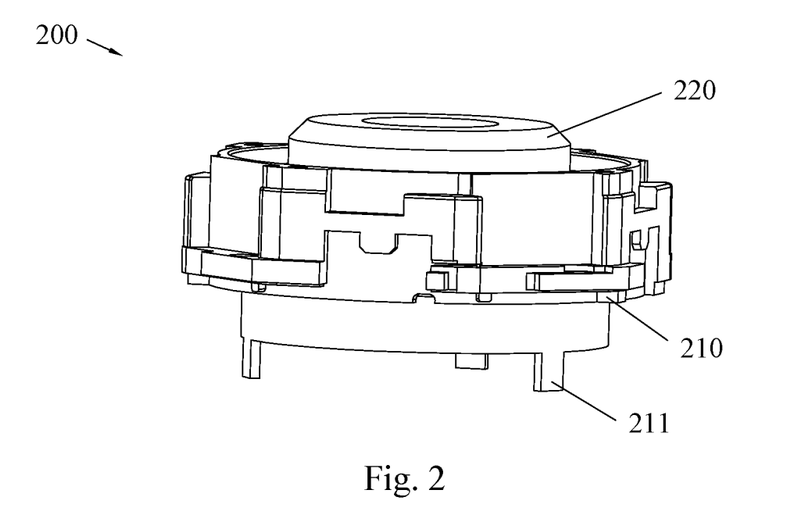
FIG. 2 is a perspective view of a lens assembly according to an embodiment of the present invention.
Figure 3A:
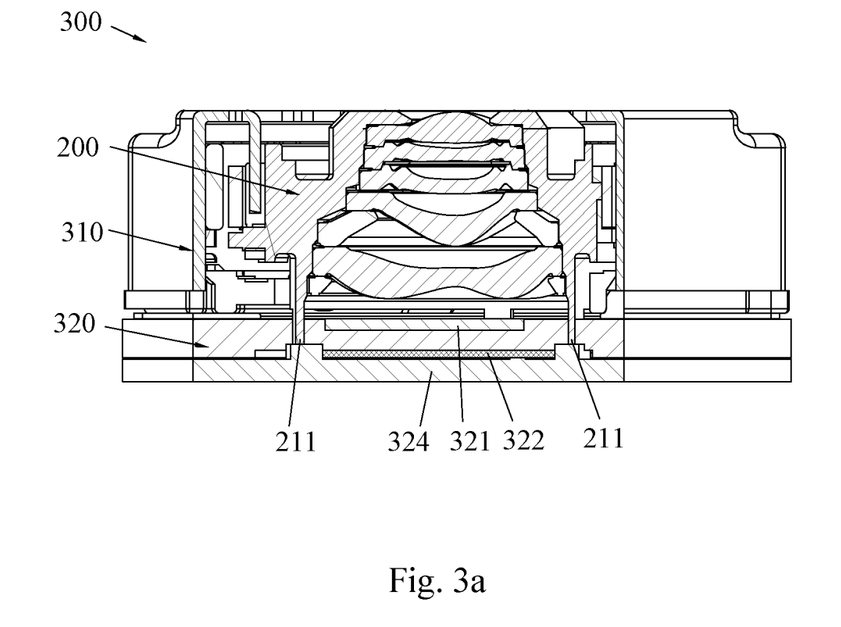
FIG. 3a is a cross-sectional view of a lens assembly according to an embodiment of the present invention.
Figure 3B:
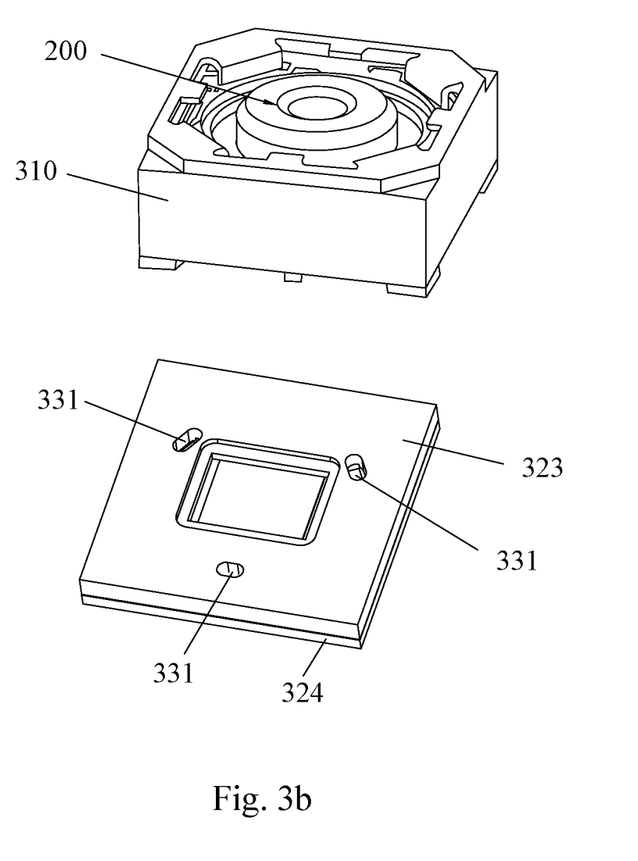
FIG. 3b is a partial assembly view of the camera module of the present invention, which shows the assembly between the lens assembly with the motor driver and the image sensor.
Figure 3C:
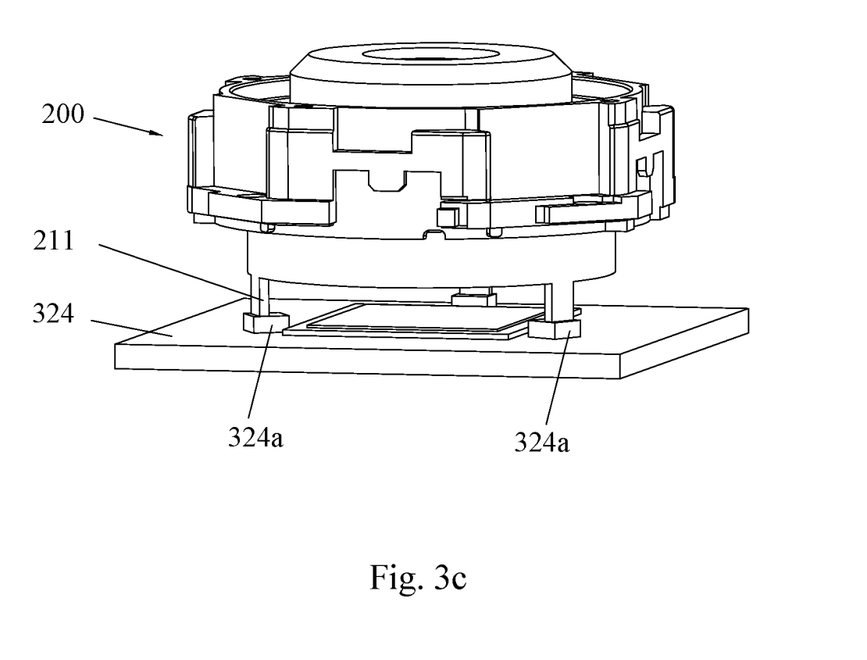
FIG. 3c is a partial assembly view of the camera module of the present invention, which shows the assembly between the lens assembly and the image sensor.

Referring to FIGS. 2 to 3c, a lens assembly 200 according to an embodiment of the present invention includes a lens holder 210 and a lens barrel 220 that are coaxial and integrated in a unity, the lens holder 210 is arranged around the lens barrel 220, and a cavity is defined in the interior of the lens barrel 220 to receive the lens. The lens in the present invention could apply lens groups with large depth of field. Specifically, the top of the lens barrel 220 is extruded from the top of the lens holder 210, and multiple guiding legs 211 are extended from the bottom of the lens holder 210. In the present invention, preferably, the amount of the guiding legs 211 is three, at least. The three guiding legs 211 define a plane which is parallel to the installation plane of the lens. Specifically, the guiding legs 211 protruded from the bottom edge of the lens holder 210 have the same height, and the plane defined by the guiding legs 211 is parallel to the surface of the image sensor chip that will be installed subsequently. Preferably, the three guiding legs 211 are evenly distributed on the circumference of the bottom of the lens holder 210 in the same spacing; alternatively, they can be arranged in different spacing.

In other embodiments, the amount of the guiding legs 211 can be four or more, and arranged on the circumference of the bottom of the lens holder 210 in the same or different spacing.

In the present invention, since the lens holder 210 and the lens barrel 220 are in a unity structure, thus the assembly structure (such as the conventional screw thread structure) between the lens holder 210 and the lens barrel is omitted, and the lens stacks can be directly installed in the cavity of the lens barrel 220, thereby simplifying the assembly process and reducing the assembly tolerance produced during the assembly process. In addition, because the guiding legs 211 extended from the lens holder 210 define the plane which is parallel to the installation plane of the lens, when the lens assembly 200 is assembled with the image sensor chip, the guiding legs 211 pass through guiding holes on the image sensor cover and align with the surface of the image sensor, in such a way, the plane defined by the guiding legs 211 is parallel to the surface of the image sensor, that is the assembly benchmarks are the same, thereby achieving the accurate optical axis alignment and reducing the assembly tolerance of the parts to prevent optical axis deviation, therefore improving the imaging quality. Furthermore, the alignment can be made without expensive alignment devices, thereby decreasing the manufacturing cost.

FIGS. 3a to 3c show an embodiment of a camera module with the lens assembly 200. As shown in FIG. 3a, the camera module 300 includes a lens assembly 200, a lens driver 310 and an image sensor assembly 320 (such as CMOS assembly). Specifically, the lens driver 310 is a voice coil motor (VCM), and the lens assembly 200 is mounted in the lens driver 310 along the optical axis direction, and the image sensor assembly 320 is located below the lens assembly 200 and assembled with the lens assembly 200. More specifically, the VCM driver 310 is a conventional VCM assembly, which includes a base, springs, magnetic elements, coils and gaskets (not shown in detail), the detailed structures and the assembly process of these elements are well known, and thus which are omitted here. The image sensor assembly 320 includes a filter 321, an image sensor 322, a sensor cover 323 and a PCB 324. Specifically, the image sensor 322 is installed on the PCB 324, the hollow sensor cover 323 is arranged on the image sensor 322, and the filter 321 is supported on the top of the sensor cover 323 and formed between the driver 310 and the sensor cover 323. Preferably, the sensor cover 323 and the base of the driver 300 are integrated in a unity. Detailed structures of the parts of the image sensor assembly 320 are well known the persons skilled in the art, and are omitted here therefore.

As shown in FIGS. 3a to 3c, the guiding legs 211 of the lens assembly 200 pass through the guiding holes 331, and then directly contact with the surface of the PCB 324. Specifically, multiple protrusions 324a are formed on the PCB 324, as shown in FIG. 3c. When the lens assembly 200 performs the optical axis alignment process, the guiding legs 211 of the lens assembly 200 pass through the guiding holes 331 and rest on the protrusions 324a of the PCB 324, and the center of the image sensor 322 is aligned with the optical axis of the lens assembly 200. In such a way, the optical axis alignment and the installation are achieved. The camera module 300 of the present embodiment is applicable to use the lens assembly that is in a mode of automatic focus in a single direction (upper direction). The plane defined by the guiding legs 211 is parallel to the surface of the PCB 324 to reduce the assembly tolerance.

Figure 4:
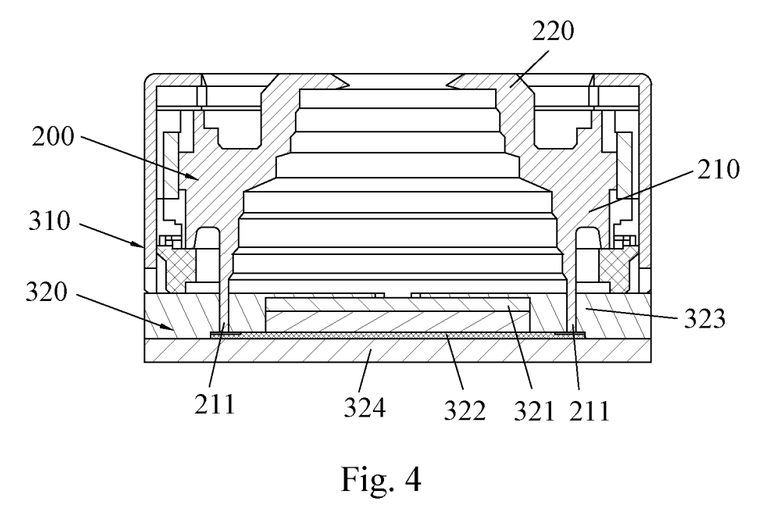
FIG. 4 is a cross-sectional view of a lens assembly according to another embodiment of the present invention.

FIG. 4 shows another embodiment of the present invention. As illustrated, multiple guiding holes 331 are provided on the sensor cover 323, at the position corresponding with the guiding legs 211. When the lens assembly 200 is to be assembled with the image sensor assembly 320, the guiding legs 211 of the lens assembly 200 pass through the guiding holes 331 and rest on the surface of the image sensor 322 directly, and the center of the image sensor 322 is aligned with the optical axis of the lens assembly 200. In such a way, the optical axis alignment and the installation are achieved. The camera module 300 of the present embodiment is applicable to use the lens assembly that is in a mode of automatic focus in a single direction (upper direction). The plane defined by the guiding legs 211 is parallel to the surface of the image sensor 322 to reduce the assembly tolerance.

Figure 5:
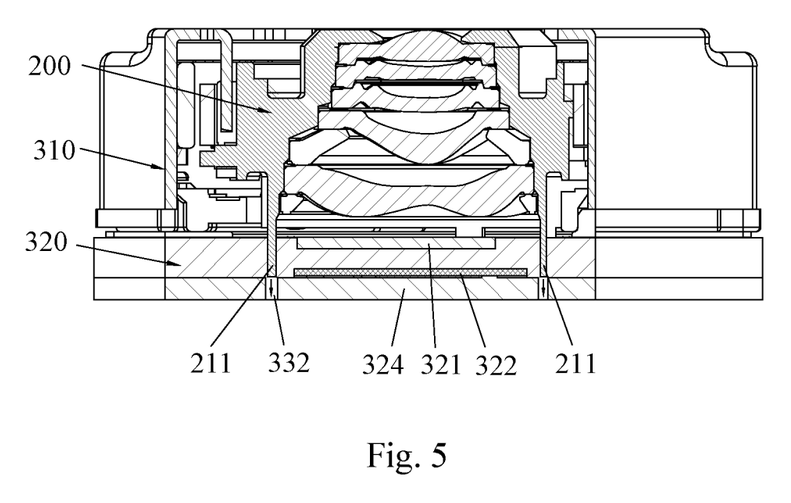
FIG. 5 is a cross-sectional view of a lens assembly according to one more embodiment of the present invention.

To meet the lens assembly with a mode of automatic focus in two directions (upper and downward directions), FIG. 5 shows one more embodiment, first guiding holes 331 (referring to FIG. 3b) are formed on the sensor cover 323, and second guiding holes 332 are formed on the surface of the PCB 324, the guiding legs 211 of the lens assembly 200 pass through the first guiding holes 331 and inserts into the second guiding holes 332, and are movable in the second guiding holes 332. During the alignment, a fixture (not shown) for holding the lens assembly 200 is provided with through holes corresponding with the guiding holes 331, 332. This fixture will be removed after the alignment is done, the guiding legs 211 are inserted into the second guiding holes 332 of the PCB 324. The plane defined by the guiding legs 211 is coplanar with the fixture, thus the assembly tolerance is reduced.

The assembling process of the camera module of the present invention follows. Firstly, the image sensor assembly 320 and the lens driver 310 are assembled respectively in advance, then, the lens driver 310 is assembled with the image sensor assembly 320, the lens assembly 200 is installed in the lens driver 310, and the guiding legs 211 of the lens assembly 200 is located above the image sensor assembly 320 and contacted with the surface of the image sensor assembly 320 to achieve the optical axis alignment. The optical axis alignment process can be referred to the above embodiments.

In conclusion, since the lens holder 210 and the lens barrel 220 are in a unity structure, thus the assembly structure (such as the conventional screw thread structure) between the lens holder 210 and the lens barrel is omitted, and the lens stacks can be directly installed in the cavity of the lens barrel 220, thereby simplifying the assembly process and reducing the assembly tolerance produced during the assembly process. In addition, because the guiding legs 211 extended from the lens holder 210 define the plane which is parallel to the installation plane of the lens, when the lens assembly 200 is assembled with the image sensor chip, the guiding legs 211 pass through guiding holes on the image sensor cover and align with the surface of the image sensor, in such a way, the plane defined by the guiding legs 211 is parallel to the surface of the image sensor, that is the assembly benchmarks are the same, thereby achieving the accurate optical axis alignment and reducing the assembly tolerance of the parts to prevent optical axis deviation, therefore improving the imaging quality. Furthermore, the alignment can be made without expensive alignment devices, thereby decreasing the manufacturing cost.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A lens assembly, comprising a lens holder and a lens barrel that are coaxial and integrated in a unity, a cavity being defined therein to receive at least one lens, wherein at least three guiding legs are extended from a bottom of the lens holder, the guiding legs define a plane that is parallel to an installation plane of the lens, wherein the at least three guiding legs pass through at least three guiding holes formed on a sensor cover arranged on an image sensor.

2. The lens assembly according to claim 1, wherein the at least three guiding legs are evenly arranged on a circumference of the bottom of the lens holder, in a predetermined spacing.

3. The lens assembly according to claim 1, wherein four guiding legs are evenly arranged on a circumference of the bottom of the lens holder, in a predetermined spacing.

4. A camera module, comprising a lens assembly, a lens driver and a image sensor assembly, the lens assembly being installed in the lens driver along an optical axis direction, the image sensor assembly located below the lens assembly, the lens assembly comprising a lens holder and a lens barrel that are coaxial and integrated in a unity, a cavity being defined therein to receive at least one lens, wherein at least three guiding legs are extended from a bottom of the lens holder, the at least three guiding legs define a plane that is parallel to an installation plane of the lens, and the at least three guiding legs are located above the image sensor assembly and contacted with a surface of the image sensor assembly to achieve optical axis alignment, wherein the image sensor assembly comprises a PCB (Printed Circuit Board), an image sensor mounted on the PCB, and a sensor cover arranged between the image sensor and the lens driver, wherein at least three first guiding holes are formed on the sensor cover, and the at least three guiding legs pass through the at least three first guiding holes.

5. The camera module according to claim 4, wherein the at least three guiding legs contact with a surface of the PCB.

6. The camera module according to claim 4, wherein at least three protrusions are formed on the surface of the PCB, on which the at least three guiding legs are rest.

7. The camera module according to claim 4, wherein the at least three guiding legs contact with a surface of the image sensor.

8. The camera module according to claim 4, wherein at least three second guiding holes are formed on the PCB, and the at least three guiding legs pass through the first guiding holes and are movable in the second guiding holes.

9. A manufacturing method of a lens assembly, comprising:
   integrating a lens barrel with a lens holder; and
   installing at least one lens in the lens holder;
   wherein the lens holder and the lens barrel are integrated in a unity, at least three guiding legs are extended from a bottom of the lens holder, the at least three guiding legs define a plane that is parallel to an installation plane of the lens, and the at least three guiding legs pass through at least three guiding holes formed on a sensor cover arranged on an image sensor.

10. The manufacturing method according to claim 9, wherein the at least three guiding legs are evenly arranged on a circumference of the bottom of the lens holder, in a predetermined spacing.

11. The manufacturing method according to claim 9, wherein four guiding legs are evenly arranged on a circumference of the bottom of the lens holder, in a predetermined spacing.

12. An assembly method of a camera module, comprising:
   assembling an image sensor assembly;
   installing a lens driver on the image sensor assembly;
   installing a lens assembly in the lens driver, the lens assembly comprising a lens holder and a lens barrel that are coaxial and integrated in a unity, a cavity being defined therein to receive at least one lens, at least three guiding legs being extended from a bottom of the lens holder, and the at least three guiding legs defining a plane that is parallel to an installation plane of the lens;
   forming at least three first guiding holes on a sensor cover of the image sensor assembly; and
   locating the at least three guiding legs on the image sensor assembly to achieve optical axis alignment wherein the guiding legs pass through the first guiding holes.

13. The assembly method according to claim 12, wherein the at least three guiding legs are contacted with a surface of a PCB (Printed Circuit Board) of the image sensor assembly.

14. The assembly method according to claim 12, wherein the at least three guiding legs are contacted with a surface of an image sensor of the image sensor assembly.

15. The assembly method according to claim 12, further comprising forming at least three second guiding holes on a PCB (Printed Circuit Board) of the image sensor assembly, wherein the at least three guiding legs pass through the first guiding holes and are movable in the second guiding holes.

* * * * *